United States Patent [19]

Yoshimaru

[11] Patent Number: 4,935,917
[45] Date of Patent: Jun. 19, 1990

[54] MEMORY DISK HAVING SOME CAPACITY RECORDING AREAS ON A SPIRAL TRACK

[75] Inventor: Tomohisa Yoshimaru, Yokohama, Japan

[73] Assignee: Kabushiki Kaishi Toshiba, Kawasaki, Japan

[21] Appl. No.: 249,277

[22] Filed: Sep. 22, 1988

Related U.S. Application Data

[60] Continuation of Ser. No. 36,347, Apr. 9, 1987, abandoned, which is a continuation of Ser. No. 889,384, Jul. 25, 1986, Pat. No. 4,751,693, which is a division of Ser. No. 625,365, Jun. 27, 1984, Pat. No. 4,641,294.

[30] Foreign Application Priority Data

Jun. 30, 1983 [JP] Japan ................................ 58-119357

[51] Int. Cl.⁵ .............................................. G11B 23/00
[52] U.S. Cl. .................................................... 369/275.3
[58] Field of Search ....................... 358/342, 312, 310;
360/10.1, 33.1, 51, 73.03, 72.2; 369/111, 275, 50, 240, 275, 30, 32

[56] References Cited

U.S. PATENT DOCUMENTS

| | | | |
|---|---|---|---|
| 4,016,603 | 4/1977 | Ottesen | 360/72.2 |
| 4,094,013 | 6/1978 | Hill et al. | 369/111 |
| 4,190,860 | 2/1980 | Somers et al. | |
| 4,310,916 | 1/1982 | Dil | 369/111 |
| 4,417,330 | 11/1983 | Hazel et al. | 369/32 |
| 4,439,849 | 3/1984 | Nabeshima | 369/50 |
| 4,512,006 | 4/1985 | Murakami et al. | 369/50 |
| 4,530,018 | 7/1985 | Hoshino et al. | |
| 4,550,347 | 10/1985 | Nakamuta | |
| 4,587,643 | 5/1986 | Monen et al. | 369/59 |
| 4,613,965 | 9/1986 | Hori et al. | 369/59 |
| 4,796,098 | 1/1989 | Giddings | 358/342 |

FOREIGN PATENT DOCUMENTS 0080256 1/1983 European Pat. Off. .

OTHER PUBLICATIONS

Herald et al., Zone Recording Flexible Diskette Drive via Microprocessor Control, IBM Technical Disclosure Bulletin, vol. 23, No. 11, Apr. 1981.

Primary Examiner—Donald McElheny, Jr.
Attorney, Agent, or Firm—Cushman, Darby & Cushman

[57] ABSTRACT

An optical disk apparatus has an optical head for recording information on or reproducing information from an optical disk. The optical disk has a number of spiral or concentric tracks and a number of sectors formed along the circumferential direction of the disk. The sectors are divided into a plurality of sector blocks along the circumferential direction of the disk. Each sector block includes a different number of sectors which are continuous along the circumferential direction and which have a substantially constant linear length. A memory stores at least the speed data for maintaining a constant relative speed between the optical head and optical disk and is determined for each block group having a predetermined number of blocks. Speed data corresponding to the designated sector block is read out from the memory and is supplied to a velocity control circuit. A motor is driven to maintain a constant linear velocity between the optical head and the tracks of the optical disk.

2 Claims, 3 Drawing Sheets

| MOTOR SPEED DATA | NUMBER OF SECTOR | START SECTOR NUMBER | INITIAL BLOCK NUMBER |
|---|---|---|---|
| 1 | 40 | 00 | 000000 |
| 2 | 39 | 15 | 002459 |
| 3 | 38 | 40 | 005210 |
| ⋮ | ⋮ | ⋮ | ⋮ |
|  | 20 |  | 300000 |

MEMORY DISK HAVING SOME CAPACITY RECORDING AREAS ON A SPIRAL TRACK

This is a continuation of application Ser. No. 036,347 filed Apr. 9, 1987, now abandoned, which is a continuation of Ser. No. 889,384 filed July 25, 1986, now U.S. Pat. No. 4,751,693, which is a division of Ser. No. 625,365 filed June 27, 1984, now U.S. Pat. No. 4,641,294.

BACKGROUND OF THE INVENTION

The present invention relates to a memory disk apparatus and, more particularly, to a memory disk apparatus for recording data on tracks of a memory disk or for reproducing recorded data on the tracks while rotating the memory disk and a head relative to each other.

In a document filing system, an optical disk apparatus is used. The optical disk apparatus includes an optical memory disk having a number of spiral or concentric tracks. Data is recorded on or recorded data is reproduced from the tracks of the rotating optical disk. For example, a document is two-dimensionally scanned with light, and optical image data of the document is photoelectrically converted into electrical image data. The electrical image data is recorded on the tracks of the optical memory disk. The recorded data is retrieved and is reproduced as hard or soft copy, as needed. Recording or reproducing data on or from tracks of an optical memory disk is performed by an optical head which is arranged in the proximity of the surface of the rotating optical memory disk. The optical head is mounted on a carriage of a motor which is linearly moved along the radial direction of the optical disk. A position detector is arranged to detect the position of the optical head relative to the position of the carriage of the linear motor. The position detector has an optical linear scale unit. The optical linear scale unit includes first and second lattice pattern members which are sequentially arranged between a photoemissive element and a photoelectric element. The first lattice pattern member is coupled to the carriage for movement therewith. The second lattice pattern member is fixed in position and serves as an optical filter.

In the apparatus of the configuration described above, the linear motor is moved while the position of the optical head is detected by the position detector from the position of the carriage. Thus, the optical head can be positioned at a desired track within 0.1 mm.

In the conventional optical memory disk described above, when data is recorded on or reproduced from the disk, the disk is rotated at a given rotational speed and the data is recorded on or reproduced from tracks of the disk in units of sectors. Such data recording or reproduction is performed while the peripheral speed is increased as the head moves radially outward. Therefore, the recording density is lowered toward the outer periphery of the disk, and the overall recording density cannot be improved.

SUMMARY OF THE INVENTION

It is an object of the present invention to provide a memory disk apparatus which can improve the recording density of data on a memory disk.

According to an aspect of the present invention, there is provided a memory disk apparatus wherein a plurality of track blocks having the same track length is assigned to disk tracks, the track blocks each having a different number of sectors along the circumferential direction of the disk. A memory is provided to store a data table which includes at least, disk rotational speed data and address data which are both set for each predetermined number of track blocks among the plurality of track blocks. Also, the rotational speed of the disk is changed in accordance with each predetermined number of track blocks.

DETAILED DESCRIPTION OF THE PREFERRED EMBODIMENT

Figure 1:
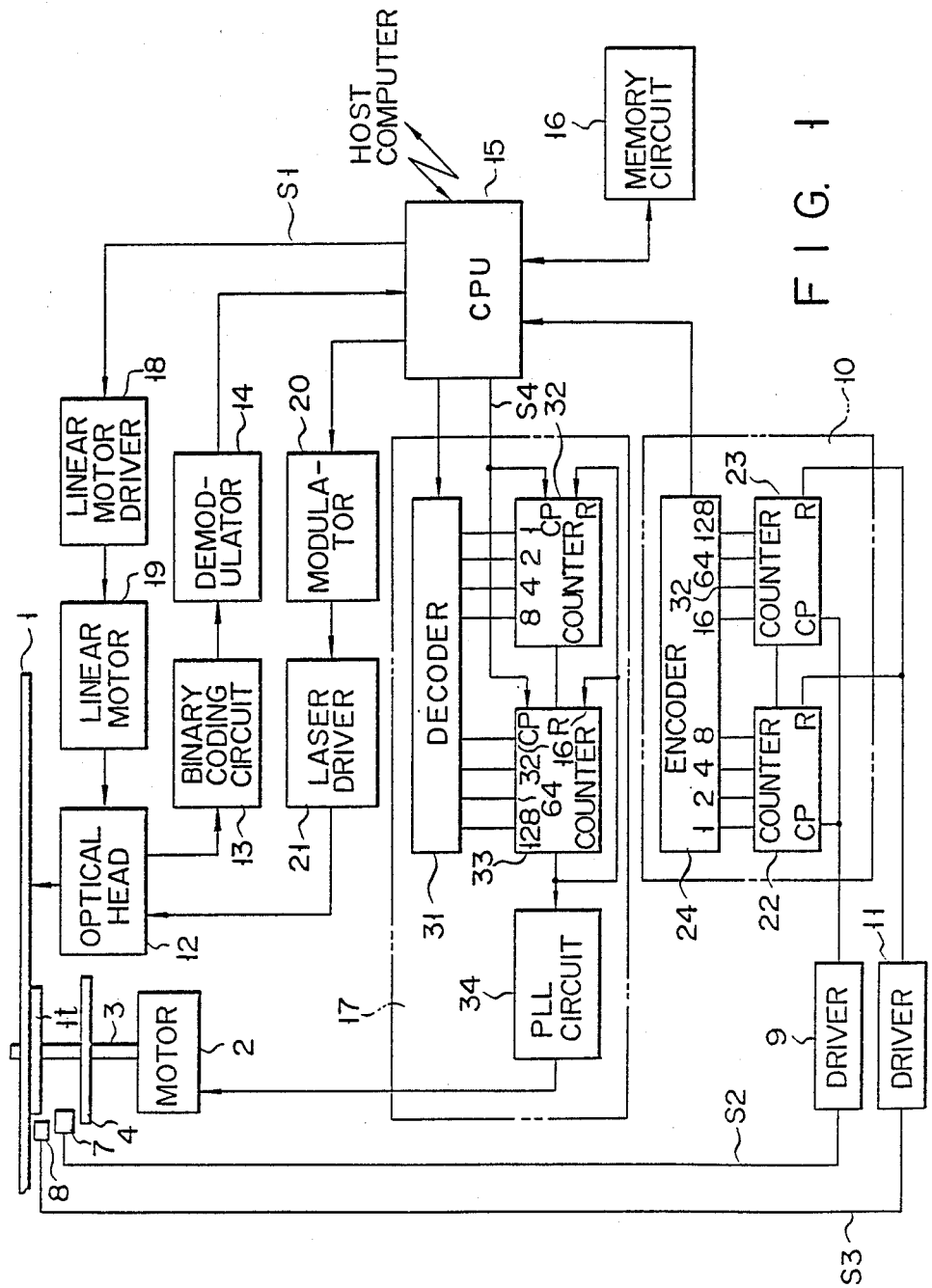
FIG. 1 is a schematic block diagram showing a rotatable memory disk apparatus according to an embodiment of the present invention.

FIG. 1 is a schematic block diagram showing a rotatable memory disk apparatus according to an embodiment of the present invention.

Figure 2:
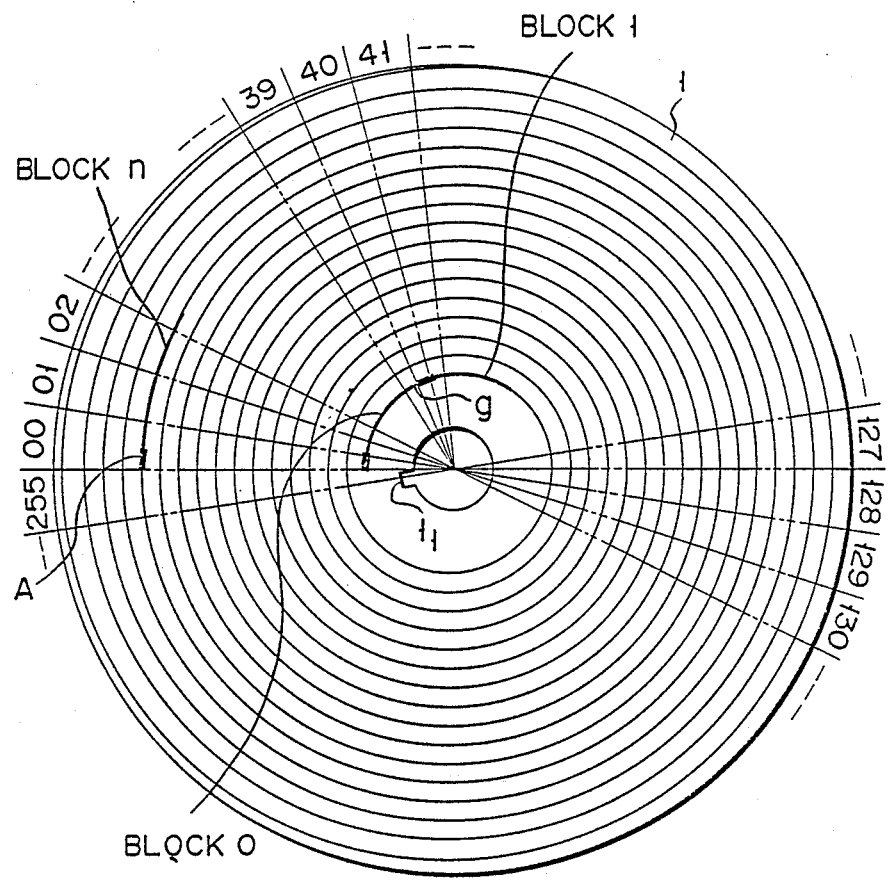
FIG. 2 is a plan view showing the format of the optical memory disk shown in FIG. 1.

The optical memory disk 1 shown in FIG. 1 comprises a circular substrate of a material such as glass or plastic and a doughnut-like metal layer formed thereon and made of a metal such as tellurium or bismuth. As shown in FIG. 2, a notched portion or a reference position mark $l_1$ is formed in the vicinity of the center of the metal layer. The disk is divided into 256 sectors 0 to 255 with reference to the reference position mark $l_1$ as 0. Spiral grooves are formed on the disk 1 extending outwards. Track numbers are given to the tracks star from the first track at the disk center, and 36,000 tracks (track No. 36,000) are generally obtained.

The 36,000 tracks of the disk 1 are divided into, for example, 300,000 blocks, or data units. In this case, the respective blocks in the inner and outer tracks have a different number of sectors, or angular extents so as to allow recording at a uniform density on the disk. One block in the innermost track has 40 sectors, while one block in the outermost track has 20 sectors. When a given block does not end at the boundary or the end of the final sector for given data, a gap is formed between the data end and the next sector. For example, when block 0 ends before the first sector (No. 40) of block 1, the disk is divided into blocks such that a block gap g is formed in the final sector (No. 39) of block 0, each block starting from the sector top position. A block header A having the block or track number is recorded at the head of each block. The block header A is recorded when the data is recorded on the disk.

Figures 3, 4:
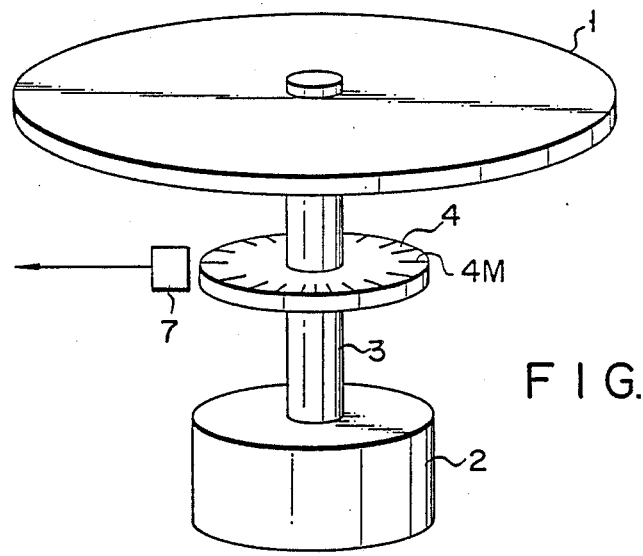
FIG. 3 is a perspective view showing the relationship between the optical memory disk shown in FIG. 1 with a revolution mark detector and a sector mark detector.
FIG. 4 is a table showing an example of the format of the memory circuit shown in FIG. 1.

An optical disk having the format as shown in FIG. 2 is placed on a turntable lt, as shown in FIG. 1. The turntable lt is coupled to a shaft 3 of a motor 2, as shown in FIG. 3. A clock disk 4 having at its periphery sector marks 4M of equal intervals corresponding to the sectors (No. 00 to 255) of the disk 1 is fixed to the shaft 3. A sector mark detector 7 is arranged near the outer periphery of the clock disk 4. The sector mark detector 7 comprises a photointerruptor having a photoemissive element and a photoelectric element, and optically detects the sector marks 4M. The output terminal of the sector mark detector 7 is connected to a driver 9.

A reference mark detector 8 for optically detecting the reference position mark $l_1$ (FIG. 2) formed on the disk 1 is arranged therebelow. The detector 8 comprises a photointerruptor similar to that of the detector 7. The output terminal of the detector 8 is connected to a driver 11. The output terminals of the detectors 7 and 8 are connected to a sector counter 10. The sector counter 10 counts the number of sectors in accordance with the sector mark and reference position mark signals S2 and S3 supplied from the detectors 7 and 8. The sector counter 10 comprises counters 22 and 23, and an encoder 24. Every time a sector mark signal S2 is supplied to the counters 22 and 23, the counters 22 and 23 count the signal S2. The counters 22 and 23 are reset by the reference position mark S3. The encoder 24 decodes the counts of the counters 22 and 23 and supplies the decoded signals to a control circuit 15.

An optical head 12 is arranged near the lower surface of the optical memory disk 1. The optical head 12 is mounted on a carrier (not shown) of a linear motor 19. The linear motor 19 is connected to a linear motor driver 18. When the linear motor 19 is driven by the driver 18, the motor 19 moves the optical head 12 along the radial direction of the optical memory disk 1. The optical head 12 includes, for example, a laser, a collimating lens for focusing a laser beam from the laser, a beam splitter for splitting the laser beam emerging from the collimating lens, a λ/4 wavelength plate, an objective lens, a voice coil for driving the objective lens, photosensor for receiving the reflected beam, and so on.

The control circuit, such as a CPU 15, for controlling the overall optical disk apparatus is connected to a host computer, and to a memory circuit 16. In response to a block number data of the disk 1 from the host computer, the CPU 15 calculates the track number and the start sector number for accessing the data, in with the data table shown in FIG. 4 stored in the memory circuit 16. The CPU 15 then calculates the data corresponding to the calculated track number and the start sector number. The CPU 15 is also connected to the linear motor driver 18 to supply an address signal corresponding to the calculated track number thereto. Then, the optical head 12 is moved to a position corresponding to the designated track number by the linear motor 19. When the optical head 12 comes to this position, the CPU 15 receives, in the reproduction mode, the data reproduced from the designated track by the optical head 12 through a binary coding circuit 13 and a demodulator 14. In the recording mode, the CPU 15 supplies record data supplied from the host computer to the optical head 12 through a modulator 20 and a laser driver 21. In accordance with the received modulated data, the laser driver 21 drives a semiconductor laser (not shown) in the optical head 12 so as to record the record data on the designated track of the disk 1.

The data table shown in FIG. 4 which is stored in the memory circuit 16 includes the motor speed data for each 256 tracks of the 36,000 tracks, the number of sectors for each block of speed data, and the initial block number and start sector number thereof for each 256 tracks of the motor speed data.

When the CPU 15 receives data representing block number 10 from the host computer, the CPU 15 determines that the block number, 10, corresponds to a block group having track number 0 to 2458. The initial or first block number corresponding to these track numbers is retrieved from the table (FIG. 4) of the memory circuit 16. In the table, the first block number corresponding to the input block number 10 is 0. The start sector number (00) and the number of sectors (40) of the block are read from the address of the first block number (0). The track number and block number are calculated from the readout start sector number (00) and the number of sectors (40). In other words, the initial block number (0) is subtracted from the target block number (10). The result is multiplied by the number of sector (40) and then added to the number of the start sector (00). This figure is divided by 256 plus the track number of the initial block. The quotient obtained by this calculation is the track number, and the remainer is the sector number. Thus, a track number of 1 and a start sector number of 144 are obtained. When data representing track number 1 thus calculated is supplied to the linear motor driver 18, the optical head 12 is moved to a position corresponding to track number 1. The track number corresponding to the initial block number is determined by the format of the optical disk, and data on the track number is obtained from the disk. The CPU 15 also calculates the required motor speed from the motor speed data corresponding to block number 0. During this motor speed calculation process, a constant (94) is added to the motor speed data. The constant (94) is determined in accordance with the optimal peripheral speed of the disk. In the innermost periphery, the fundamental clock signal S4 is frequency-divided into 1/95, and used for the motor speed for the innermost periphery of the disk. When the data obtained by the motor speed calculation is supplied to a velocity control circuit 17, the circuit 17 drives the motor 2 so that the relative speed between the optical head 12 and the disk track has a constant linear velocity. The velocity control circuit 17 includes a decoder 31, counters 32 and 33, and a PLL circuit 34. The decoder 31 supplies a signal supplied from the CPU 15 and which represents the rotational speed data to the counters 32 and 33. Thus, the counters 32 and 33 are set at the preset values corresponding to the rotational speed data. The counters 32 and 33 receive fundamental clock pulses from the CPU 15 and count them. When the count values reach the preset values corresponding to the speed data, the counters 32 and 33 supply motor clock pulses to the PLL circuit 34. The PLL circuit 34 drives the motor 2 in accordance with the motor clock pulse supplied from the counter 33.

When the CPU 15 calculates the track number, it converts the calculated value into a scale value. Thereafter, the CPU 15 drives the linear motor driver 18 until the scale value coincides with the scale value detected by the output from a position detecting unit (not shown).

In the access mode described above, when the optical head 12 is moved to the position of the target track, that is, to track No. 1 and the start sector number (00) coincides with the count value from the sector counter 10, the CPU 15 starts to record or to reproduce data using the optical head 12.

The mode of operation of the optical memory disk apparatus as shown in FIG. 1 will be described below, using as an example data read out from the optical disk 1. Assume that an access signal representing the number of a block to be accessed is supplied to the CPU 15. From this access signal, the CPU 15 will calculate or extract the motor speed data, track number and sector number corresponding to the block number in accordance with the data of the table of FIG. 4. For example, an access signal corresponding to block number 10 is supplied to the control circuit 15 from the host computer. Then, in accordance with the memory content of the memory circuit 16, the CPU 15 determines that the block number 10 corresponds to block numbers 0 to 2458, the initial block number for the tracks 0 to 255 is 0, the start sector number corresponding to block number 0 is 00, and that the number of sectors in the block having the block number 0 is 40. The CPU 15 then calculates the track address and the sector address for block number 10. That is, the calculation, {(10−0)×40+0}÷256+0, is performed. As a result of this, a quotient of 1 and a remainer of 144 are obtained. Therefore, a track number of 1 and a sector number of 144 is obtained.

The CPU 15 reads out a motor speed data of 1 corresponding to initial block number 0 from the memory circuit 16 and adds the constant of 94 to the motor speed data of 1 to provide a speed data or rotation data of 95 for the motor 2. The CPU 15 supplies the calculated speed data of 95 to the decoder 31. The decoder 31 supplies a signal corresponding to the input speed data of 95 to the counters 32 and 33 to preset them as mod 95 counters. Every time the counter 33 counts 95 clock pulses from the CPU 15, it supplies a motor clock pulse to the PLL circuit 34. In response to a motor clock pulse from the counter 33, the PLL circuit 34 drives the motor 2. In this case, the PLL circuit 34 drives the motor 2 at a velocity of 260 rpm/s.

Subsequently, the CPU 15 supplies a first track-addressing signal S1 corresponding to the designated track to the linear motor driver 18. The linear motor driver 18 drives the linear motor 19 to move the optical head 12 along the radial direction of the disk 1. In this manner, the optical head 12 is positioned corresponding to the track designated by the signal S1. Then, the optical head 12 reproduces data recorded on the addressed track, and the reproduced data is coded by the binary coding circuit 13. The coded data is demodulated by the demodulator 14, and the demodulated data is supplied through the control circuit 15 to the host computer to be processed.

When data is to be read out from another block of the optical disk 1, a similar operation to that described above is performed.

When data is to be written on the optical disk 1, up until the optical head 12 is moved to the position of the block to be accessed, the operation is the same as that in the recording mode and so will not be described.

When the optical head 12 reaches access block number 10, the CPU 15 supplies record data from the host computer to the modulator 20. The record data is modulated by the modulator 20, and the modulated data is supplied to the laser driver 21. The laser driver 21 drives the semiconductor laser (not shown) and the record data is recorded on the corresponding track of the optical disk 1.

When data is to be written in another block of the optical disk 1, a similar operation to that described above is performed.

As the optical head moves outward along the radial direction of the disk, the rotational speed of the motor, that is, the rotational speed of the optical memory disk is increased, so that the relative speed between the track on the disk and the optical head is a constant linear speed at any position of the disk. For this reason, data can be recorded with a highly uniform density on all tracks.

When data is to be recorded on or reproduced from the optical memory disk, movement of the optical head to the recording or reproducing position, and rotation of the disk is easy to perform.

In the embodiment described above, the block header is recorded in each block when data is recorded. However, the block number may be preformatted. Although an optical disk is used in the above embodiment, a magnetic disk, a floppy disk or any other type of disk can also be used. Furthermore, in the embodiment described above, a conversion table stores, for each predetermined number of blocks, the number of sectors in each block, address data of the initial block, and rotational speed data. However, the conversion table may store, in each block, the number of sectors in the block, the address data, and the rotational speed data.

What is claimed is:
1. A memory disk comprising:
a spiral track along which information is recorded at a substantially constant recording density; and
a plurality of data recording areas provided along said spiral track, each said data recording area having a substantially same length area so that each said data recording area has a substantially same recording capability, and each said data recording area including at least a header including a data recording area number designating a location of said each data recording data on said spiral track, wherein
a starting position of each of said data recording areas being disposed at one of a plurality of predetermined radii of said disk, each two adjacent radii having a same interior angle and forming a radial extent therebetween, a position of each said data recording area on said track being determined as beginning at one of said plurality of radial extents, and a number of radial extents said data recording area crosses being determined by a position on the disk.

2. A memory disk comprising:
a spiral track along which information is recorded at a substantially constant recording density; and
a plurality of data recording areas provided along said spiral track, each said data recording area having a substantially same circumferential length, so that each said data recording area has a substantially same amount of said information recorded therein and each said data recording area including at least a header that has a data recording area number designating a location on said memory disk of said each data recording area, wherein
a starting position of each of said data recording areas are disposed at one of a plurality of predetermined radii of said disk, two adjacent radii having a same interior angle and forming a radial extent therebetween, a position of each said data recording area on said track determining how many of said plurality of radial extents form said circumferential length.

* * * * *